US012616333B2

(12) United States Patent
Ben Baruch et al.

(10) Patent No.: US 12,616,333 B2
(45) Date of Patent: May 5, 2026

(54) CARTRIDGE EXTRACTION UNIT FOR WATER PURIFIER

(71) Applicant: STRAUSS WATER LTD, Or Yehuda (IL)

(72) Inventors: Omer Ben Baruch, Kiryat Ono (IL); Eyal Krystal, Kfar-Saba (IL); Dany Ascher, Kibbutz Mishmarot (IL); Orly Nahum, Ramat Gan (IL)

(73) Assignee: STRAUSS WATER LTD.

( * ) Notice: Subject to any disclaimer, the term of this patent is extended or adjusted under 35 U.S.C. 154(b) by 544 days.

(21) Appl. No.: 18/003,950

(22) PCT Filed: Jul. 1, 2021

(86) PCT No.: PCT/IL2021/050814
§ 371 (c)(1),
(2) Date: Dec. 30, 2022

(87) PCT Pub. No.: WO2022/003697
PCT Pub. Date: Jan. 6, 2022

(65) Prior Publication Data
US 2023/0263334 A1     Aug. 24, 2023

(30) Foreign Application Priority Data
Jul. 1, 2020    (IL) ......................................... 275788

(51) Int. Cl.
*A47J 31/60*        (2006.01)
*A47J 31/46*        (2006.01)
(Continued)

(52) U.S. Cl.
CPC ............. *A47J 31/605* (2013.01); *A47J 31/46* (2013.01); *B01D 35/306* (2013.01); *C02F 1/003* (2013.01);
(Continued)

(58) Field of Classification Search
CPC .......... A47J 31/605; A47J 31/46; A47J 31/44; A47J 31/40; B01D 35/306;
(Continued)

(56) References Cited

U.S. PATENT DOCUMENTS

| | | |
|---|---|---|
| 5,397,462 A | 3/1995 | Higashijima et al. |
| 2002/0130140 A1 | 9/2002 | Cote |

(Continued)

FOREIGN PATENT DOCUMENTS

| | | |
|---|---|---|
| CN | 202681646 | 1/2013 |
| CN | 106458558 | 2/2017 |

(Continued)

OTHER PUBLICATIONS

International Search Report and Written Opinion in International Appln. No. PCT/IL2021/050814, mailed Sep. 6, 2021, 12 pages.

*Primary Examiner* — Waqaas Ali
(74) *Attorney, Agent, or Firm* — Fish & Richardson P.C.

(57)        ABSTRACT

A beverage dispenser comprising: a cartridge receiving chamber 108, the chamber comprising a water inlet 112 and a treated water outlet 114 configured to connect to a cartridge water inlet and a treated water cartridge outlet of a water treatment cartridge, respectively; a cartridge seat 116, slidingly displaceable within the cartridge receiving chamber 108 between a cartridge operative position in which the cartridge water inlet and the treated water cartridge outlet establish a fluid communication with the water inlet and the treated water outlet of said chamber, respectively, and a cartridge extraction position in which the cartridge water inlet and the treated water cartridge outlet are disengaged from the water inlet and the treated water outlet of the chamber, respectively, the cartridge seat configured to engage a seat-receiving location formed at an external wall portion of said cartridge when received within the cartridge receiving chamber; and a user accessible actuation member (Continued)

120 switchable between a locked position and an unlocked position, the actuation member being configured to slidingly displace the cartridge seat between said cartridge operative position, corresponding to said locked position, and said cartridge extraction position that corresponds to said unlocked position.

18 Claims, 5 Drawing Sheets

(51) Int. Cl.
  *B01D 35/30* (2006.01)
  *C02F 1/00* (2023.01)
(52) U.S. Cl.
  CPC ...... *B01D 2201/24* (2013.01); *B01D 2201/29* (2013.01); *C02F 2201/004* (2013.01); *C02F 2201/006* (2013.01); *C02F 2307/10* (2013.01)

(58) Field of Classification Search
  CPC . B01D 2201/24; B01D 2201/29; C02F 1/003; C02F 2201/004; C02F 2201/006; C02F 2307/10; C02F 9/20
  See application file for complete search history.

(56) References Cited

U.S. PATENT DOCUMENTS

| | | | |
|---|---|---|---|
| 2010/0018238 A1 | 1/2010 | Gerner et al. | |
| 2016/0263504 A1* | 9/2016 | Lin ......................... | C02F 1/003 |

FOREIGN PATENT DOCUMENTS

| | | |
|---|---|---|
| CN | 106659316 | 5/2017 |
| EP | 1775538 | 4/2007 |

\* cited by examiner

CARTRIDGE EXTRACTION UNIT FOR WATER PURIFIER

CROSS-REFERENCE TO RELATED APPLICATIONS

This application is a National Stage Application under 35 U.S.C. § 371 and claims the benefit of International Application No. PCT/IL2021/050814, filed Jul. 1, 2021, which claims priority to Israel Patent Application No. 275788, filed Jul. 1, 2020. The disclosure of the foregoing application is hereby incorporated by reference in its entirety.

TECHNOLOGICAL FIELD

The present disclosure concerns beverage dispensers of the kind that comprise exchangeable water treatment cartridges, more specifically the dispensers having a unit for extracting the cartridge.

BACKGROUND

Beverage dispensers which dispense water-based beverages typically comprise one or more water treatment cartridges for treating source water to remove various contaminants therefrom. Such cartridges typically need to be replaced after a predetermined number of liters that pass through the cartridge and/or after a predetermined number of filtering cycles.

When the dispenser is designed to be compact, e.g. for domestic use, the cartridge typically fits into a limited space within the dispenser, causing the cartridge to have limited user-accessibility for its replacement.

GENERAL DESCRIPTION

According to this disclosure, there is provided a mechanism for extracting a water treatment cartridge from a beverage dispenser, enabling a user to easily remove the cartridge from the dispenser and replace it by a fresh cartridge.

Thus, according to a first aspect of this disclosure, there is provided a beverage dispenser that comprises a housing having a cartridge receiving chamber, the chamber comprises a water inlet and a treated water outlet configured to connect to a cartridge water inlet and a treated water cartridge outlet of a water treatment cartridge, respectively. The cartridge receiving chamber is fitted with a cartridge seat, that is slidingly displaceable within the cartridge receiving chamber between a cartridge operative position in which the cartridge water inlet and the treated water cartridge outlet establish fluid communication with the water inlet and the treated water outlet of said chamber, respectively, and a cartridge extraction position in which the cartridge water inlet and the treated water cartridge outlet are disengaged from the water inlet and the treated water outlet of the chamber, respectively. The cartridge seat is configured to engage a seat-receiving location formed at an external wall portion of the cartridge when it is received within the cartridge receiving chamber. A user accessible actuation member is associated with the cartridge seat and is switchable between a locked position and an unlocked position, the actuation member being configured to slidingly displace the cartridge seat between said cartridge operative position, corresponding to said locked position, and said cartridge extraction position that corresponds to said unlocked position.

Thus, once a water treatment cartridge is inserted into the cartridge receiving chamber, the cartridge seat engages the seat-receiving location of the cartridge, and couples the seat with the cartridge. Displacement of the actuation member by the user between its locked and unlocked positions causes the cartridge seat to slidingly displace from its cartridge operative position to its cartridge extraction position, hence displacing the cartridge associated therewith to enable a user to access the cartridge and extract it from the cartridge receiving chamber for replacement.

In the text below an arbitrary directionality is used in reference to cartridge and/or the cartridge receiving chamber. The term "top" is arbitrarily applied to the upper side of the cartridge or the chamber that faces the user. Consistent therewith an element-relating frame of reference includes a vertical direction that extends between the top side and the opposite, bottom side of the cartridge.

Typically, the cartridge extraction position is vertically displaced from the cartridge operative position along a longitudinal axis of the cartridge receiving chamber. However, it is also contemplated that the cartridge receiving chamber may be positioned horizontally or angularly within the dispenser—in such cases, the cartridge extraction position will be horizontally or angularly displaced from the cartridge operative position along a longitudinal axis of the cartridge receiving chamber.

The cartridge receiving chamber may, by some embodiments, comprise a top opening that is configured to permit insertion and extraction of the cartridge from the cartridge receiving chamber. The opening is typically dimensioned to be slightly larger than the largest diameter of the cartridge to be inserted into the chamber and match the cross-sectional shape of the cartridge.

In order to prevent unintentional extraction of the cartridge from the cartridge receiving chamber during operation of the cartridge, the cartridge is typically received within the chamber when the cartridge seat is at its cartridge operative position, such that a top external surface of the cartridge is flush with or below a rim of the cartridge receiving chamber. As the cartridge extraction position of the cartridge seat is vertically displaced from the cartridge operative position of the cartridge seat, transition of the seat from the cartridge operative position to the cartridge extraction position causes the top surface of the cartridge chamber to protrude above the rim of the cartridge receiving chamber, thus enabling extraction of the cartridge from the chamber by the user when needed.

In some embodiments, the cartridge may comprise an extraction accessory associated (or integral) with a top surface thereof, such that the accessory is non-accessible to the user when the cartridge seat is at its cartridge operative position, and becomes accessible to the user when the seat is displaced into its cartridge extraction position. The extraction accessory may be any arrangement that can permits the user to remove the cartridge from the chamber once pulling onto the accessory. Exemplary extraction accessories may be a recess dimensioned to receive a user's finger, a tab, a ring, etc.

As noted, the cartridge seat is associated with a user-accessible actuation member, operation of which causes the cartridge seat to displace between its various positions. In some embodiments, the actuation member may be a handle, vertically extending from the cartridge seat, such that pushing and pulling of the handle causes vertical displacement of the seat.

In other embodiments, the actuation member may be a lever that is associated to the cartridge seat by a movement translation mechanism, that transfers the movement of the lever to the cartridge seat.

The movement translation mechanism, may, by an embodiment, comprise a cogwheel, rotationally held between a first, vertically displaceable toothed rack associated or being part of the lever, and a second, toothed rack that is formed on a surface of the cartridge seat, whereby displacement of the lever between the locked position and the unlocked position causes downward vertical displacement of the first rack to rotate the cogwheel, thereby causing upward vertical displacement of the second rack to axially slidingly displace the cartridge seat between the cartridge operative position and the cartridge extraction position.

By some embodiments, in order to prevent a user from accessing the cartridge during its operation, the lever may extend across the cartridge insertion opening of the cartridge receiving chamber when the lever is in the locked position. In the unlocked position, the lever may be angled with respect to a plane defined by the cartridge insertion opening, thus permitting access to the cartridge for its extraction.

By an embodiment, the lever can comprise a locking latch configured, when the lever is in its locked position, to be releasably received within a latch-receiving location formed at the rim of the cartridge receiving chamber. By another exemplary arrangement, the latch-receiving location may be formed at the housing, such that the lever is releasably locked to the housing when in the locked position.

To facilitate ease of operation, the lever may, by an embodiment, comprise a user-accessible handle configured for disengaging the locking latch from the latch-receiving location.

According to another embodiment, the actuation member may be a spring-biased push button that is associated with the movement translation mechanism. The push button may have a button body that is configured with the first toothed rack, and the surface of the cartridge seat is formed with a second, toothed rack, with a cogwheel being held between the first and second toothed racks. In such an arrangement, pressing the button downwards (against the bias of the spring) to an unlocked position causes the rotation of a cogwheel and hence upward displacement of the cartridge seat, together with its associated cartridge, into the cartridge extraction position. Release of the pressure causes the spring to push the button upwards, and via rotation of the cogwheel, displaces the cartridge seat downwards to its cartridge operative position.

Provided by another aspect of this disclosure is a cartridge extraction unit configured for fitting into a cartridge receiving chamber of a beverage dispenser, the cartridge extraction unit comprising: a cartridge seat configured to slidingly displace within the cartridge receiving chamber between a cartridge operative position in which a water inlet of the cartridge and the treated water outlet of the cartridge establish a fluid communication with a water inlet and a treated water outlet of said chamber, respectively, and a cartridge extraction position in which the cartridge water inlet and the treated water cartridge outlet are disengaged from the water inlet and the treated water outlet of the chamber, respectively, the cartridge seat configured to engage a seat-receiving location formed at an external wall portion of said cartridge when received within the cartridge receiving chamber; and a user-accessible actuation member associated with the cartridge seat and switchable between a locked position and an unlocked position, the actuation member being configured to slidingly displace the cartridge seat between said cartridge operative position, corresponding to said locked position, and said cartridge extraction position that corresponds to said unlocked position.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
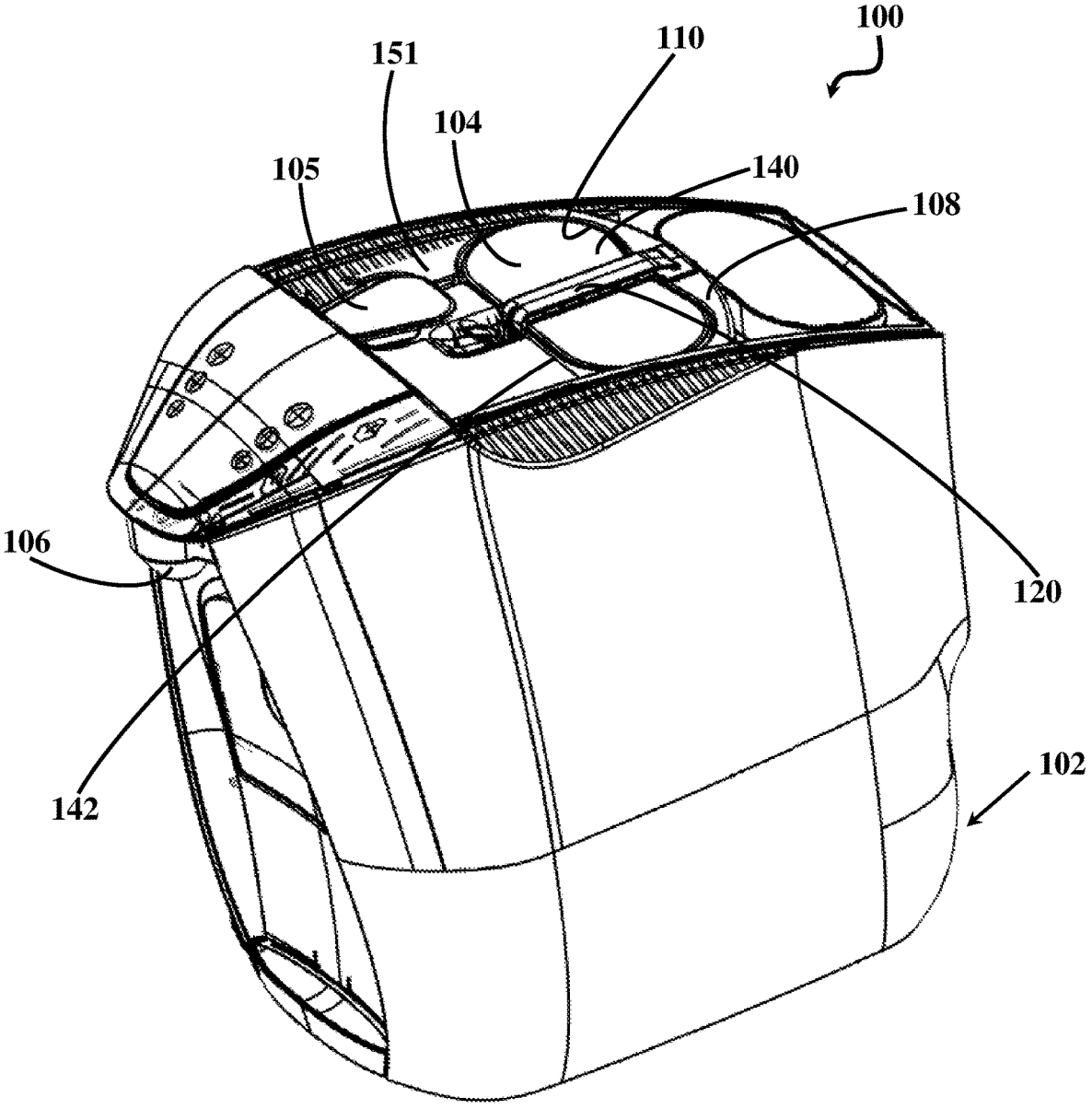
FIG. 1A is a top perspective view of a dispenser according to an embodiment of this disclosure, with a water treatment cartridge received in the cartridge receiving chamber and the actuation member being at its locked position.
Figure 1B:
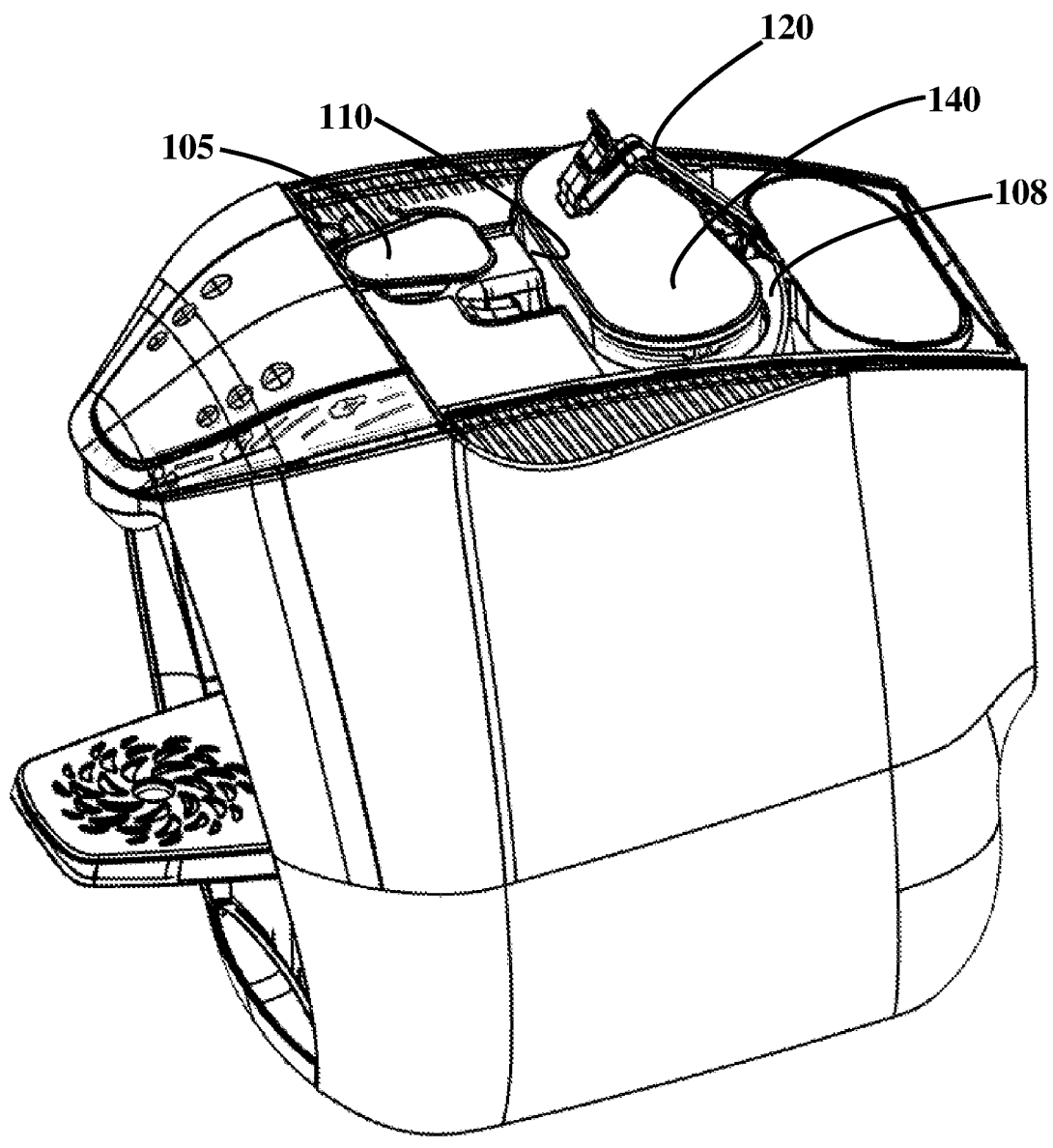
FIG. 1B shows the dispenser of FIG. 1A, however with the actuation member being at its unlocked position.
Figure 2A:
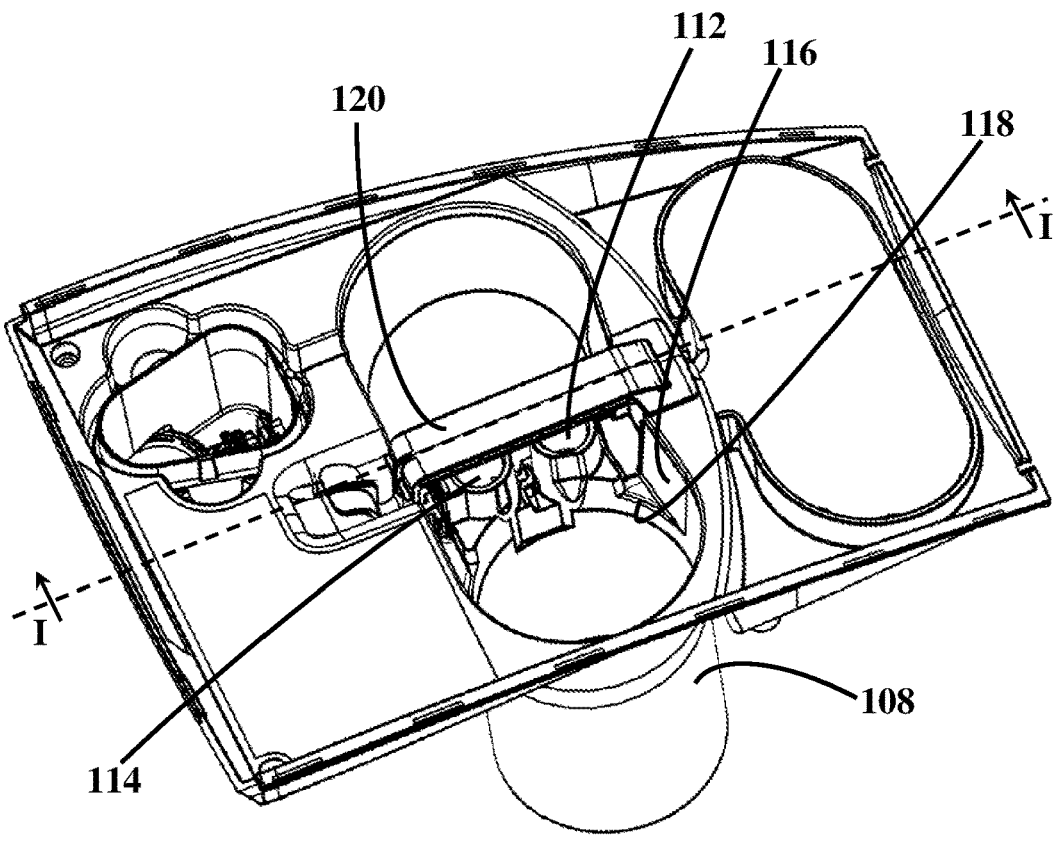
FIG. 2A is a top perspective view of the cartridge receiving chamber of the dispenser of FIG. 1A, shown in isolation with the cartridge removed for ease of viewing.
Figure 2B:
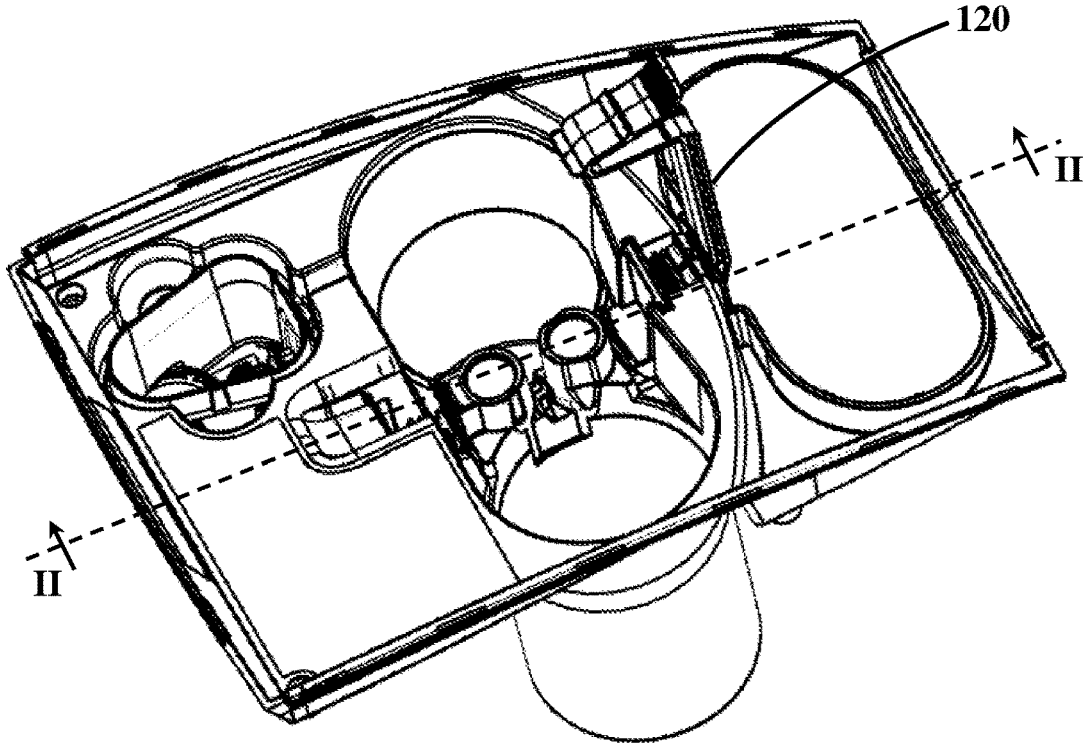
FIG. 2B is a top perspective view of the cartridge receiving chamber of the dispenser of FIG. 1B, shown in isolation with the cartridge removed for ease of viewing.

Shown in FIGS. 1A-1B, is a beverage dispenser according to an exemplary embodiment of this disclosure. Beverage dispenser 100 is configured to receive source water from a source via inlet 102, feed the source water into water treatment cartridge 104, and dispense treated water-based beverage (e.g. water, carbonated water, flavored water, hot water, cold water, etc.) via dispenser outlet 106. The dispenser may include additional disinfection utilities, such as a UV lamp 105, to further treat the source water. In this specific embodiment, water treatment cartridge 104 is received within cartridge receiving chamber 108 via a top opening 110 of the chamber, permitting insertion and extraction of the cartridge from the chamber as will be explained below.

As can better be seen in FIGS. 2A-3B, the cartridge receiving chamber 108 has a source water inlet 112 and a treated water outlet 114, configured to receive and form fluid communication with cartridge water inlet and treated water cartridge outlet (both not shown) of a cartridge when received in the chamber and in the cartridge operative position, as will be discussed below. The cartridge chamber 108 is fitted with a cartridge seat 116 constituted by L-shaped member 117, that is configured with a cartridge engaging member 118. The cartridge engaging member 118 fits into and engages with a seat-receiving location formed at an external wall portion of the cartridge (not shown) when received within the cartridge receiving chamber, thus coupling between the cartridge seat and the cartridge.

Figure 3A:
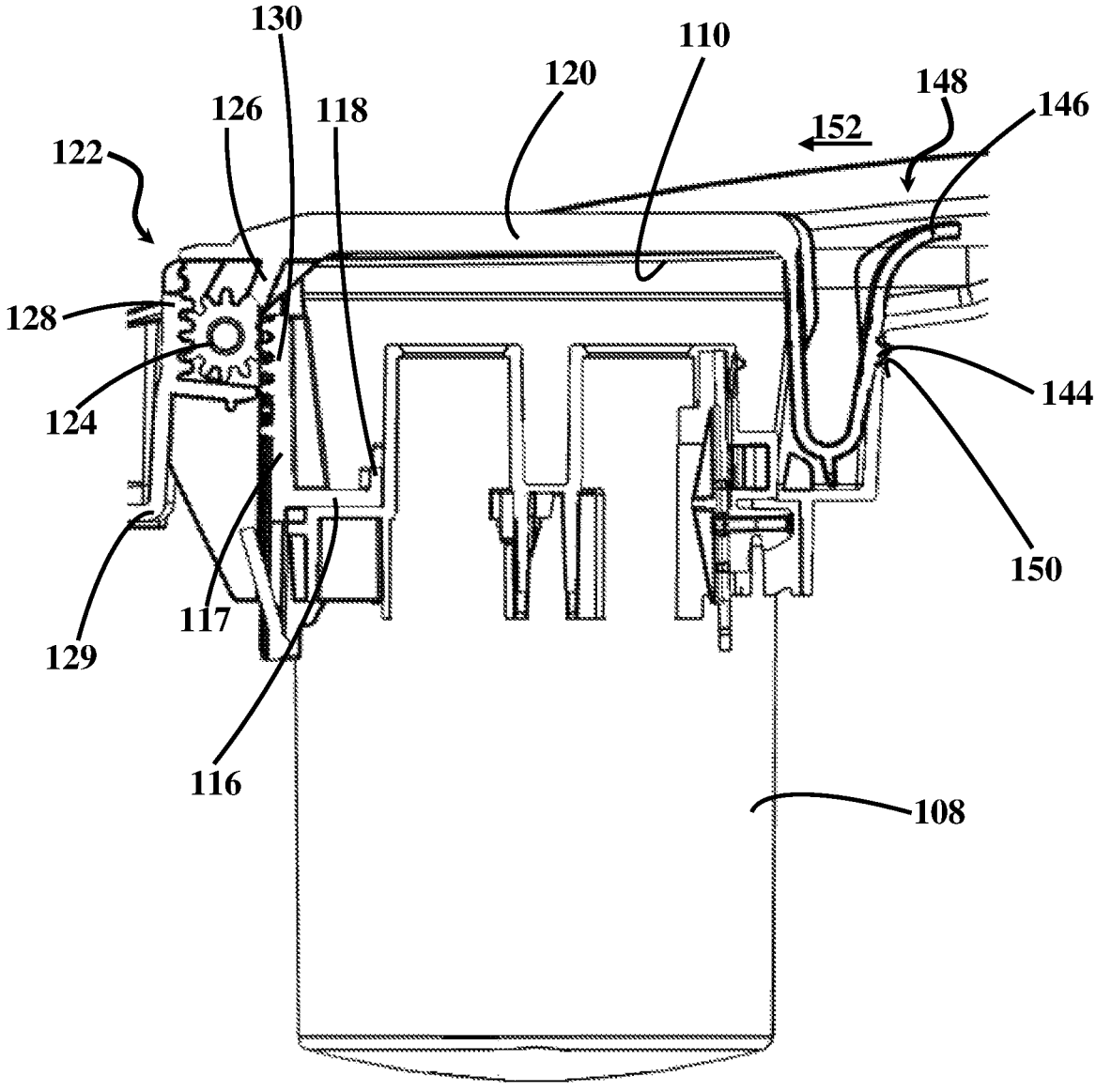
FIG. 3A is a longitudinal cross section of the cartridge receiving chamber through line I-I in FIG. 2A.
Figure 3B:
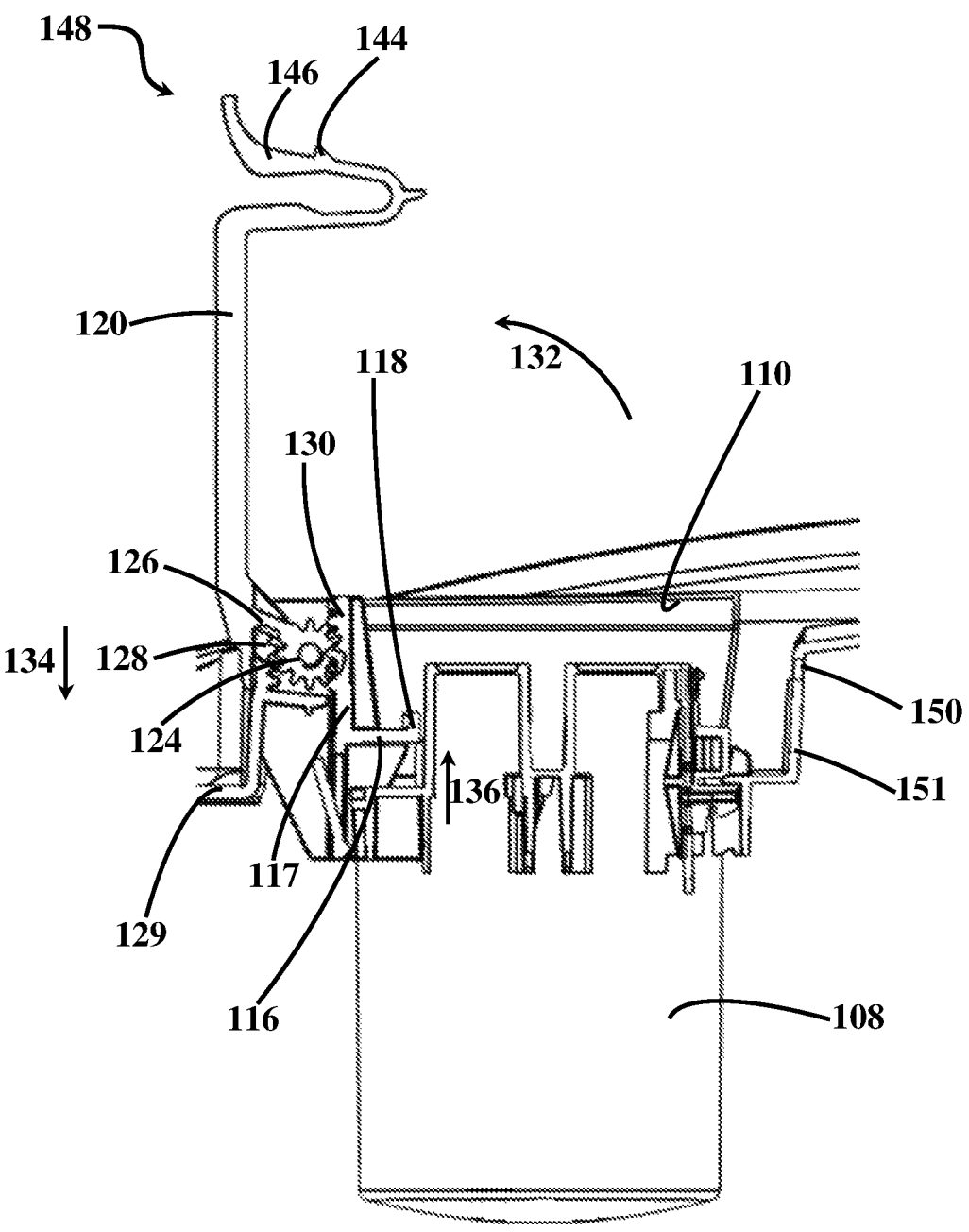
FIG. 3B is a longitudinal cross section of the cartridge receiving chamber through line II-II in FIG. 2B.

An actuation member, in this specific example being in the form of lever 120, is associated with the cartridge seat 116 via a movement translation mechanism, generally designated 122. The movement translation mechanism of this example includes a cogwheel 124, linked to lever 120 via a linking bridge 126. Thus, angular movement of the lever from its locked position (shown in FIGS. 1A, 2A, 3A) to its unlocked position (shown in FIGS. 1B, 2B, 3B) causes rotation of the cogwheel 124. Cogwheel 124 is held between two toothed racks, a first rack 128 being formed on a portion of vertically displaceable member 129, and a second rack 130 that is formed on a surface of the L-shaped member 117 forming the cartridge seat 116. Hence, angular displacement of lever 120 in the direction of arrow 132 from the locked position (FIG. 3A) to the unlocked position (FIG. 3B), causes rotation of cogwheel 124—as the cogwheel is held between racks 128 and 130, its rotation causes simultaneous downward displacement of member 129 in the direction of arrow 134, and upward vertical displacement of L-shaped member 117 along the direction of arrow 136. The upward displacement of L-shaped member 117 causes the cartridge seat 116 (and the cartridge held thereby) to displace from its cartridge operative position (FIG. 3A) to its cartridge extraction position (FIG. 3B).

As can be seen in FIG. 1A, when the lever is in its locked position, the cartridge seat is at its cartridge operative position, such that a top surface 140 of the cartridge 104 is flush with a rim 142 of the chamber 108. When the lever is moved to its unlocked position (FIG. 1B), the cartridge seat is displaced upwardly into the cartridge extraction position, causing the top surface 140 to protrude from the chamber beyond rim 142, thus enabling user access to the cartridge for its removal from the chamber.

Lever 120 extends across top opening 110 of chamber 108 when the lever is in its locked position, thus both holding the cartridge in its operative position and preventing undesired extraction of the cartridge from the chamber during its operation. For holding the lever 120 in its locked position, the lever is provided with a locking latch 144, configured onto a flexible or semi-flexible arm 146 of the lever's user-accessible handle 148. The locking latch is configured to be releasably received within a latch-receiving location, in this example within slot 150, formed in the housing 151 of dispenser 100. Due to its partial flexibility, pressing the arm 146 towards the direction of arrow 152 will cause the locking latch 144 to disengage from the slot 150, thereby unlocking the lever and permitting its displacement from the locked position to the unlocked position.

It is noted that the movement translation mechanism (or any of its parts) and/or the latch receiving location can be associated with sensors, e.g. microswitches, allowing a controlling unit of the dispenser to receive indication of the position of the lever and/or the cartridge seat. Flow sensors can also be provided at one or both of the source water inlet and the treated water outlet of the chamber in order to provide indication whether the cartridge is in operation or disengaged from the water inlet and outlet of the chamber.

The invention claimed is:

1. A beverage dispenser comprising:
   a housing having a cartridge receiving chamber, the chamber comprising a water inlet and a treated water outlet configured to connect to a cartridge water inlet and a treated water cartridge outlet of a water treatment cartridge, respectively;
   a cartridge seat, slidingly displaceable within the cartridge receiving chamber between a cartridge operative position in which the cartridge water inlet and the treated water cartridge outlet establish a fluid communication with the water inlet and the treated water outlet of said chamber, respectively, and a cartridge extraction position in which the cartridge water inlet and the treated water cartridge outlet are disengaged from the water inlet and the treated water outlet of the chamber, respectively, the cartridge seat configured to engage a seat-receiving location formed at an external wall portion of said cartridge when received within the cartridge receiving chamber; and
   a user accessible actuation member associated with the cartridge seat and switchable between a locked position and an unlocked position, the actuation member being configured to slidingly displace the cartridge seat between said cartridge operative position, corresponding to said locked position, and said cartridge extraction position that corresponds to said unlocked position,
   wherein said user accessible actuation member is a lever associated with the cartridge seat via a movement translation mechanism, the movement transition mechanism comprises a cogwheel, rotationally held between a first, vertically displaceable toothed rack associated or being part of the lever, and a second, toothed rack that is formed on a surface of the cartridge seat, whereby displacement of the lever between the locked position and the unlocked position causes downward vertical displacement of the first rack to rotate the cogwheel, thereby causing upward vertical displacement of the second rack to axially slidingly displace the cartridge seat between the cartridge operative position and the cartridge extraction position.

2. The beverage dispenser of claim 1, wherein the cartridge extraction position is vertically displaced from the cartridge operative position along a longitudinal axis of the cartridge receiving chamber.

3. The beverage dispenser of claim 2, wherein the cartridge receiving chamber comprises a top opening configured to permit insertion and extraction of the cartridge from the cartridge receiving chamber.

4. The beverage dispenser of claim 3, wherein, when the cartridge is received with the cartridge chamber and the cartridge seat is at its cartridge operative position, a top external surface of the cartridge is flush with or below a rim of the cartridge receiving chamber, and when the cartridge seat is at its cartridge extraction position, the top surface of the cartridge chamber protrudes above said rim.

5. The beverage dispenser of claim 1, wherein in the locked position, the lever extends across a cartridge insertion opening of the cartridge receiving chamber.

6. The beverage dispenser of claim 5, wherein in the unlocked position, the lever is angled with respect to a plane defined by the cartridge insertion opening.

7. The beverage dispenser of claim 1, wherein the lever comprises a locking latch configured, when the lever is in its locked position, to be releasably received within a latch-receiving location formed at a rim of the cartridge receiving chamber.

8. The beverage dispenser of claim 1, wherein the lever comprises a locking latch configured, when the lever is in its locked position, to be releasably received within a latch-receiving location formed at the housing.

9. The beverage dispenser of claim 7, wherein the lever comprises a user-accessible handle configured for disengaging the locking latch from the latch-receiving location.

10. A cartridge extraction unit configured for fitting into a cartridge receiving chamber of a beverage dispenser, the cartridge extraction unit comprising:
   a cartridge seat configured to slidingly displace within the cartridge receiving chamber between a cartridge operative position in which a water inlet of the cartridge and a treated water outlet of the cartridge establish a fluid communication with a water inlet and a treated water outlet of said chamber, respectively, and a cartridge extraction position in which the cartridge water inlet and the treated water cartridge outlet are disengaged from the water inlet and the treated water outlet of the chamber, respectively, the cartridge seat configured to engage a seat-receiving location formed at an external wall portion of said cartridge when received within the cartridge receiving chamber; and a user-accessible actuation member associated with the cartridge seat and switchable between a locked position and an unlocked position, the actuation member being configured to slidingly displace the cartridge seat between said cartridge operative position, corresponding to said locked position, and said cartridge extraction position that corresponds to said unlocked position, wherein said user-accessible actuation member is a lever associated with the cartridge seat via a movement translation mechanism, the movement transition mechanism comprises a cogwheel, rotationally held between a first, vertically displaceable toothed rack associated or being part of the lever, and a second, toothed rack that is formed on a surface of the cartridge seat, whereby displacement of the lever between the locked position and the unlocked position causes downward vertical displacement of the first rack to rotate the cogwheel, thereby causing upward vertical displacement of the second rack to axially slidingly displace the cartridge seat between the cartridge operative position and the cartridge extraction position.

11. The cartridge extraction unit of claim 10, wherein the cartridge extraction position is vertically displaced from the cartridge operative position along a longitudinal axis of the cartridge receiving chamber.

12. The cartridge extraction unit of claim 11, wherein the cartridge receiving chamber comprises a top opening configured to permit insertion and extraction of the cartridge from the cartridge receiving chamber.

13. The cartridge extraction unit of claim 12, wherein, when the cartridge is received with the cartridge chamber and the cartridge seat is at its cartridge operative position, a top external surface of the cartridge is flush with or below a rim of the cartridge receiving chamber, and when the cartridge seat is at its cartridge extraction position, the top surface of the cartridge chamber protrudes above said rim.

14. The cartridge extraction unit of claim 10, wherein in the locked position, the lever extends across a cartridge insertion opening of the cartridge receiving chamber.

15. The cartridge extraction unit of claim 14, wherein in the unlocked position, the lever is angled with respect to a plane defined by the cartridge insertion opening.

16. The cartridge extraction unit of claim 10, wherein the lever comprises a locking latch configured, when the lever is in its locked position, to be releasably received within a latch-receiving location formed at a rim of the cartridge receiving chamber.

17. The cartridge extraction unit of claim 10, wherein the lever comprises a locking latch configured, when the lever is in its locked position, to be releasably received within a latch-receiving location formed at a housing.

18. The cartridge extraction unit of claim 16, wherein the lever comprises a user-accessible handle configured for disengaging the locking latch from the latch-receiving location.

* * * * *